April 24, 1934.   C. E. LONG   1,956,102
ANTIFOGGING DEVICE FOR GLASS WALLED REFRIGERATION CHAMBERS
Filed Nov. 22, 1930
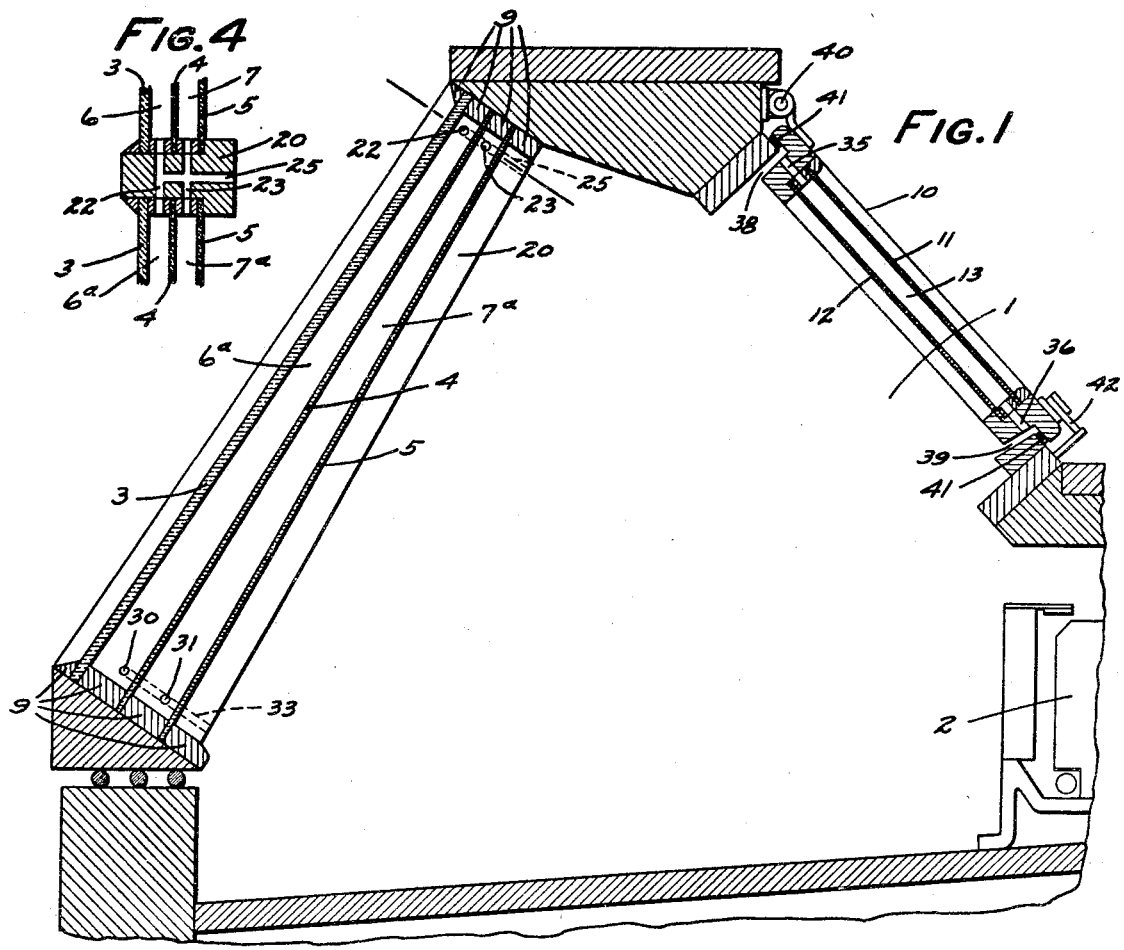
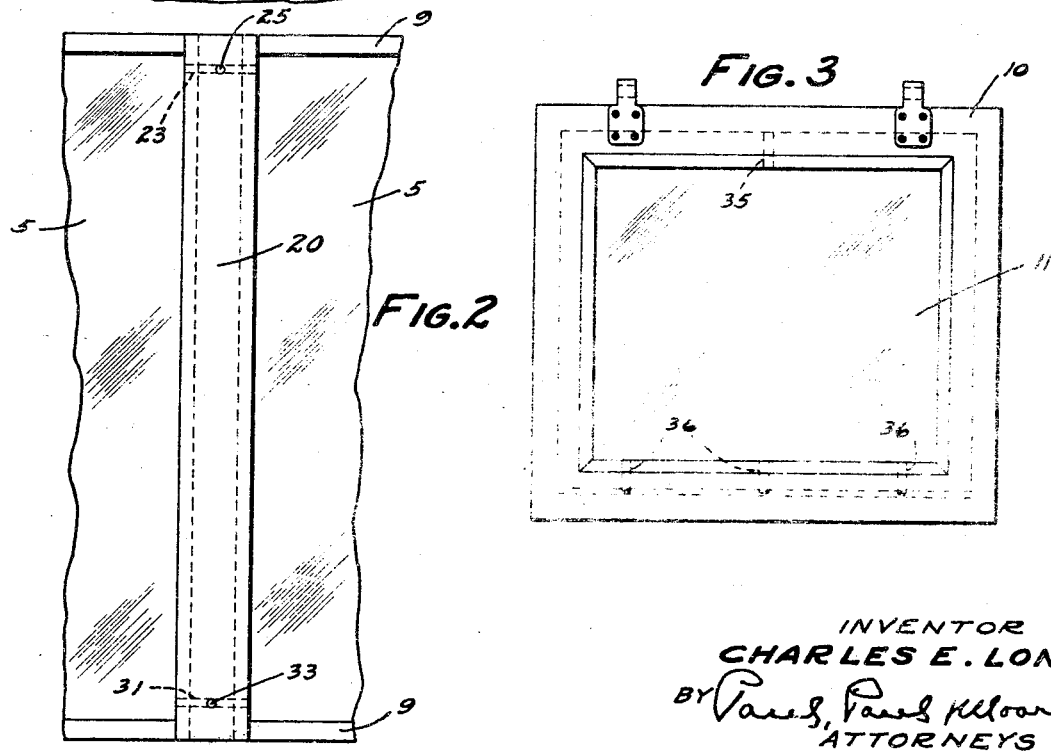
INVENTOR
CHARLES E. LONG
ATTORNEYS Patented Apr. 24, 1934

1,956,102

UNITED STATES PATENT OFFICE 1,956,102

ANTIFOGGING DEVICE FOR GLASS-WALLED REFRIGERATION CHAMBERS

Charles E. Long, Minneapolis, Minn., assignor of one-half to Puffer Hubbard Mfg. Co., Minneapolis, Minn., a corporation of Minnesota Application November 22, 1930, Serial No. 497,397

6 Claims. (Cl. 62—37)

This invention relates to a device for preventing fogging of the hollow glass walls of the refrigerating show cases, without the use of chemical cartridges. It is a common occurrence for the moisture in the air, in the chambers of compartments formed by and between the spaced panes of glass, to be precipitated on the glass, and interfere with the inspection of the goods by the customer. It is an object to establish air communication between the glass-formed compartment and the goods-display chamber and to utilize the refrigerating unit (in said display chamber) for circulating the air, and removing its moisture.

It has heretofore commonly been the practice to use cartridges of calcium chloride or some other suitable moisture-absorbable material, and to place these cartridges in the chamber to be dehumidified. A practical objection to the use of cartridges is that in order to introduce or remove them it is necessary to open the chamber to the atmosphere, at which time an in-rush of moisture-saturated air occurs. If the amount of moisture in the air is great, the newly placed cartridge is practically immediately saturated. It is well known that when saturation takes place, chemical action results in the production of colored substances which are deposited within the chamber. These substances are difficult to remove and are unsightly.

It is, therefore, an object of the present invention to do away with the use of cartridges, and to provide a very inexpensive and efficient means to ventilate the spaces, by means including ducts communicating with the chamber or chambers formed between the panes of glass, and with that space in which the refrigerating unit is placed, to the end that circulation through the glass-sided chambers results from the natural circulation in the refrigerating chamber, and to the end that the withdrawn moisture be condensed upon the refrigerating unit.

Features of the invention include all the details of construction, along with the broader features of the invention symbolically illustrated.

Objects and advantages of the invention will be pointed out in the description of the drawing forming a part of this application, and in said drawing Figure 1 is a vertical section through a refrigerating display counter showing the invention applied to the front wall and to the door;

Figure 2 is a face view from the inside illustrating the arrangement of the mullion;

Figure 3 is an outer face view of the door; and

Figure 4 is a transverse section through the top of the mullion illustrating the arrangement of the circulation establishing passages.

Figure 1 illustrates a structure providing a refrigerating chamber 1. The numeral 2 indicates a refrigerating unit which can be of any preferred form and which is connected with the usual refrigerating machine (not shown). The structure is provided with a slanting glass wall composed, in this instance, of three panes of glass respectively indicated 3, 4 and 5, spaced apart to form compartments or chambers 6—7. The glass is suitably held in spaced relation by the usual framing strips 9. The numeral 10 indicates a door which has a hollow wall formed by two spaced apart panes of glass respectively indicated 11—12, the space being indicated by numeral 13. In both cases a hollow glass wall is formed. The numeral 20, see also Figures 2 and 4, indicates a mullion dividing the hollow glass wall vertically into four glass-formed chambers or compartments, respectively indicated at 6, 6ª and 7, 7ª. It will be understood that it is not absolutely necessary to have the wall formed of three pieces of glass. The wall may be formed by two panes of glass. At the top of the mullion two passages 22—23 establish communication between chambers 6, 6ª and 7, 7ª. A passage 25 intersects the passages 22—23 to establish communication between said passages and the chamber 1. This passage slants downwardly and inwardly. Adjacent the bottom of this wall there are formed in the mullion, passages 30—31 respectively establishing communication between chambers 6, 6ª and 7, 7ª. These passages are intersected by downwardly and inwardly slanting passage 33. The arrangement of the passages at the bottom is substantially the same as the arrangement at the top, but the passages 31 to 33 may also act as drain passages, for condensed moisture. Condensation to this extent is, however, a comparatively rare occurrence.

It is commonly the practice to give this mullioned structure to the window-like sides of a case, the mullion being ordinarily vertically centrally arranged. In the present embodiment, the ventilating passages or ducts are arranged in this central vertically arranged mullion. This is done not only for convenience, but because the refrigerating unit is generally arranged at the longitudinal middle of the case and, therefore, this is the coldest part.

Although the invention is not limited to the arrangement of the mullion, yet the details of this structure are claimed. The general direction of circulation is inwardly from the ends of the chamber toward the mullion.

Air circulation is established through the space 13 of door 10, by a single top passage 35 centrally arranged and leading downward and inwardly, and by three bottom passages 36 leading downwardly, see Figure 3, and by forming the door at top and bottom so as to leave passages 38—39. The door is hinged as at 40 and is provided with the usual sealing gasket or strip 41, and keeper 42.

This door structure may be considered a modification, and it will be understood that the invention may be applied to any glass-formed hollow wall construction, where communication can be established between the hollow wall and a chamber which has a refrigerating unit therein. Therefore, although all the details of construction shown are claimed, the broader aspects are also claimed.

I claim as my invention.

1. A structure providing a refrigerating chamber, a refrigerating unit in the chamber, said chamber having a glass side composed of spaced panes of glass arranged to form a hollow wall, a mullion dividing the wall into two hollow compartments, passages in the mullion establishing communication between the hollow compartments, and additional passages establishing communication between the first mentioned passages and the refrigerating chamber, said passages being arranged in sets, one adjacent the top of the wall and the other adjacent the bottom.

2. A structure providing a refrigerating chamber, a refrigerating unit in the chamber, said chamber having a glass side composed of spaced panes of glass arranged to form a hollow wall, a mullion dividing the wall into two hollow compartments, passages in the mullion establishing communication between the hollow compartments, and additional passages establishing communication between the first mentioned passages and the refrigerating chamber.

3. A structure providing a refrigerating chamber having a door providing a flange operating against a gasket at the outside of the chamber, the door having a wall composed of panes of glass spaced to form a dead air chamber and passages in said door leading upwardly and downwardly respectively from its top and bottom, the top and bottom portions of the door being cut away to provide a passage which establishes communication between the passages and the interior of the refrigerating chamber.

4. A structure providing a refrigerating chamber having a door providing a flange operating against a gasket at the outside of the chamber, the door having a wall composed of panes of glass spaced to form a dead air chamber and passages in said door leading upwardly and downwardly respectively from its top and bottom, the top and bottom portions of the door being cut away to provide a passage which establishes communication between the passages and the interior of the refrigerating chamber said door having only a single passage at its upper side centrally arranged, and a plurality of passages at its lower side, said passage being substantially symmetrically arranged with reference to the vertical axis of the door, and the door being placed substantially medially with reference to the refrigerating unit.

5. A structure providing a refrigerating chamber and a refrigerating unit extending lengthwise thereof, said chamber having a glass side opposed to the unit and composed of panes of glass spaced to form a dead air space, a mullion dividing the wall into laterally related hollow compartments, horizontal passages in the mullions establishing communication between the hollow compartments, and additional passages intersecting said first mentioned passages and establishing communication between them and the refrigerating chamber, and slanting downwardly and inwardly, one set of passages being arranged adjacent the top of the mullion and the other adjacent the bottom thereof.

6. A refrigerator having a wall composed of panes of glass forming a dead air chamber, including a mullion placed vertically midway the length of the glass wall, passages at the top of the mullion establishing communication between the dead air chamber and the refrigeration chamber, passages at the bottom of the mullion establishing communication between the dead air space and the refrigerating chamber, one of each of said top and bottom passages being slanted downwardly and the other passages intersecting and communicating with said downwardly slanting passage.

CHARLES E. LONG.